(12) United States Patent
Smith et al.

(10) Patent No.: US 7,388,947 B2
(45) Date of Patent: Jun. 17, 2008

(54) CONTROLLABLE TELECOMMUNICATIONS SWITCH REPORTING COMPATIBLE WITH VOICE GRADE LINES

(75) Inventors: David B. Smith, Hinsdale, IL (US); Matthew Richard Smith, Hinsdale, IL (US); David L. Yarbrough, Reston, VA (US); Eric Edward Kampmeier, Sycamore, IL (US); Simon S. Oh, Naperville, IL (US); Thomas J. Loos, Lisle, IL (US)

(73) Assignees: Federal Bureau of Investigation, The United States of America as represented by the Office of the General Counsel, Washington, DC (US); Lucent Technologies, Inc., Murray Hill, NJ (US)

( * ) Notice: Subject to any disclaimer, the term of this patent is extended or adjusted under 35 U.S.C. 154(b) by 1106 days.

(21) Appl. No.: 10/387,554

(22) Filed: Mar. 14, 2003

(65) Prior Publication Data

US 2004/0179513 A1 Sep. 16, 2004

(51) Int. Cl.
*H04M 1/24* (2006.01)
*H04M 3/08* (2006.01)
*H04M 3/22* (2006.01)

(52) U.S. Cl. .................. 379/35; 379/32.01; 379/32.04

(58) Field of Classification Search ............. 379/32.01, 379/32.02, 32.03, 32.04, 32.05, 35, 112.01, 379/133, 134, 139, 221.11
See application file for complete search history.

(56) References Cited

U.S. PATENT DOCUMENTS

| | | | | |
|---|---|---|---|---|
| 6,078,648 A | * | 6/2000 | Albers et al. | 379/35 |
| 6,233,313 B1 | * | 5/2001 | Farris et al. | 379/112.01 |
| 6,496,483 B1 | * | 12/2002 | Kung et al. | 370/252 |
| 7,055,174 B1 | * | 5/2006 | Cope et al. | 726/22 |
| 2002/0051518 A1 | * | 5/2002 | Bondy et al. | 379/35 |
| 2003/0215069 A1 | * | 11/2003 | Hitzeman | 379/88.19 |

* cited by examiner

*Primary Examiner*—Quoc D Tran
(74) *Attorney, Agent, or Firm*—Banner & Witcoff, Ltd.

(57) ABSTRACT

Data generated at a telecommunications network switching node is selectively delivered to one or more data receiving device (e.g., data "collection box") connected to the network, and command and control signaling is transmitted from the data receiving device to the switching node. This bi-directional communication is carried out in a manner compatible with voice grade lines. In an exemplary application, call identifying information, referred to in the TIA/EIA Standard as CDC (Call Data Channel) Messages, is delivered from an Intercept Access Point (IAP) switch that provides telephone service to a subject of an authorized surveillance order, to a law enforcement data collection box, utilizing Frequency Shift Keying (FSK) signals. Control signals are sent from the data collection box to the IAP switch utilizing Dual Tone Multi-Frequency (DTMF) signaling. The state of the art is advanced, and a contribution is made to law enforcement and other fields, as the invention allows replacement of costly and lengthily provisioned data delivery circuits, such as ISDN lines or private digital data circuits, with widely available and less expensive voiceband data delivery equipment.

68 Claims, 9 Drawing Sheets

CONTROLLABLE TELECOMMUNICATIONS SWITCH REPORTING COMPATIBLE WITH VOICE GRADE LINES

FIELD OF THE INVENTION

This invention relates generally to communication systems, and more particularly to communication systems that may be used to interface with law enforcement surveillance data collection systems.

BACKGROUND OF THE INVENTION

Law enforcement agencies have a need to execute electronic surveillance on certain phone numbers, subject to a lawful surveillance order. A lawful surveillance includes the sending of call identifying information (data) and if authorized, content of a subject's communication. In order to clarify the responsibility of telephony service providers, the United States Congress passed the Communications Assistance for Law Enforcement Act of 1994 (CALEA).

CALEA further defines the existing statutory obligation of telecommunications carriers to assist law enforcement in executing electronic surveillance pursuant to court order or other lawful authorization.

Section 103 of CALEA sets forth the assistance capability requirements that telecommunications carriers need to maintain to support law enforcement in the conduct of lawfully-authorized electronic surveillance. Specifically, CALEA directs the telecommunications industry to design, develop, and deploy solutions that meet certain assistance capability requirements.

Pursuant to a court order or other lawful authorization, carriers must be able to: (1) expeditiously isolate all wire and electronic communications of a target transmitted by the carrier within its service area; (2) expeditiously isolate call-identifying information of a target; (3) provide intercepted communications and call-identifying information to law enforcement; and (4) carry out intercepts unobtrusively, so targets are not made aware of the electronic surveillance, and in a manner that does not compromise the privacy and security of other communications.

A standard for intercepting the subject's communication call identifying information and content has been defined in the TIA/EIA J-STD-025 and J-STD-025A standards, herein incorporated by reference. Two levels of intercept apply, Level 1 and Level 2. Level 1 intercepts provide call details (a.k.a. call identifying information), such as the calling party number, the called party number, the date and time of the call, and other details related to the subject's communication. Level 2 intercepts provide Level 1 details, as well as call content, such as a copy of the voice or data transmitted.

J-STD-025/025A defines the surveillance information to be delivered to law enforcement and some common data encoding methods for subject call identifying information to be used. The method of access to call identifying information and/or content within the subject's serving switch varies by switch vendor and switch architecture. The term "Intercept Access Point" (IAP) is used to refer to the particular switch or switches in the telecommunications network wherein access to subject communications details and content occurs. The interface between Access and Delivery, commonly referred to as the 'd' interface, is also specific to the platform implementation.

The delivery interface, from the IAP switch to the law enforcement agency data collection box, is not defined in the standards and therefore each switch vendor has developed transport methods to assure information delivery to law enforcement.

The current method for delivering call identifying information from an IAP switch to law enforcement has not been defined as standard and generally relies on ISDN (Integrated Services Digital Network) or digital data circuits transporting X.25 data packets over high speed links. Although this method is able to deliver the required data, in most cases it is both costly and too complex for law enforcement to use, especially for the smaller agencies. It requires expensive circuits, data routing equipment, and dedicated switch hardware, as well as complex provisioning procedures by the service provider and the law enforcement agency. These circuits provide delivery capacity far in excess of the typical user requirements. Furthermore, the method requires provisioning lead times that do not, in many cases, meet the emergency surveillance requirement of law enforcement for criminal or national security purposes.

Therefore, a need exists for a method and data collection apparatus that allows call identifying information to be sent from an IAP switch to a data collection box simply and inexpensively. A need also exists for a method and apparatus that allows the call detail content to be sent in a more timely manner utilizing the Public Switched Telephone Network (PSTN), thus avoiding the need for private law enforcement networks for delivery of the data. Delivery of a subject's call identifying information (data) is a subject of this invention.

SUMMARY OF THE INVENTION

The present invention provides, in one aspect, a method for selectively delivering information generated at a telecommunications network switching node to a data receiving device connected to the network. The inventive methodology and apparatus permit the transmission of such data, and command and control signaling from the data receiving device, over voice grade lines. In an exemplary application, call identifying information (data), referred to in the TIA/EIA Standard as CDC (Call Data Channel) Messages, is delivered from an Intercept Access Point (IAP) switch that provides telephone service to a subject of an authorized surveillance order, to a law enforcement data collection system. The state of the art is advanced, and a contribution is made to law enforcement and other fields, by allowing replacement of costly and lengthily provisioned data delivery circuits, such as ISDN lines or private digital data circuits, with widely available and less expensive voice-band data delivery equipment.

The data may be delivered from the IAP switch to the LEA data collection box (CB) using the Frequency Shift Keying (FSK) hardware employed in Caller-ID features commonly available in the North American PSTN (Public Switched Telephone Network). Unlike the well-known Caller-ID functionality, in the present invention, information packets may be transmitted by the switch to one or more destinations other than the called party destination. Multiple sequential packets of data may be sent and assembled at the surveillance destinations to form composite call identifying messages. The message packets may be sent over voice-grade lines of the PSTN, rather than a separate signaling network (e.g., SS7 network) as is used in the case of Caller-ID signals transported by the PSTN.

Once a connection is established, the data collection box can signal control to the IAP switch by using the widely available Dual Tone Multi-Frequency (DTMF) signaling for the purpose of IAP and CB command and control, thus making the communications link a two way path (that may extend over voice-grade lines of the PSTN). Command and control messages may also be sent from the IAP Switch to the data collection box utilizing similar DTMF signaling. The FSK/DTMF method described by this invention is possible on many if not all North American switch platforms using existing circuits under common switching control and maintenance practices. This realizes a lower cost implementation, faster provisioning, and more flexible connections to the LEA data collection box, (e.g. using the PSTN) when compared to dedicated ISDN or digital data circuit provisioning. In accordance with the invention voice-grade dial-up circuits and modified Caller-ID software may be utilized to deliver law enforcement surveillance data, e.g., CDC messages, or other data of limited length, using caller ID hardware.

The present invention introduces a two-way command and control communications link that does not exist in today's call intercept implementations. The present invention allows available switch hardware, simple analog delivery circuits and existing network facilities to be used for delivery to law enforcement or other data recipients, at any selected data collection location served by the PSTN. The present invention also provides methods of bandwidth control, by monitoring the link usage and data buffer fill or fill rate and selecting alternative, pre-programmed delivery DN's, and data message error detection and retransmission, by evaluating the GR-30 checksum and/or decoding the CDC Message and comparing with the expected standard message format. Retransmission requests may be made for all faulty sub-packets compromising a full message or for all packets starting with a specified position. Improvements to this retransmission request may specify the individual packet in error if all others are found to be error free.

DETAILED DESCRIPTION OF THE PREFERRED EMBODIMENTS

Figure 1:
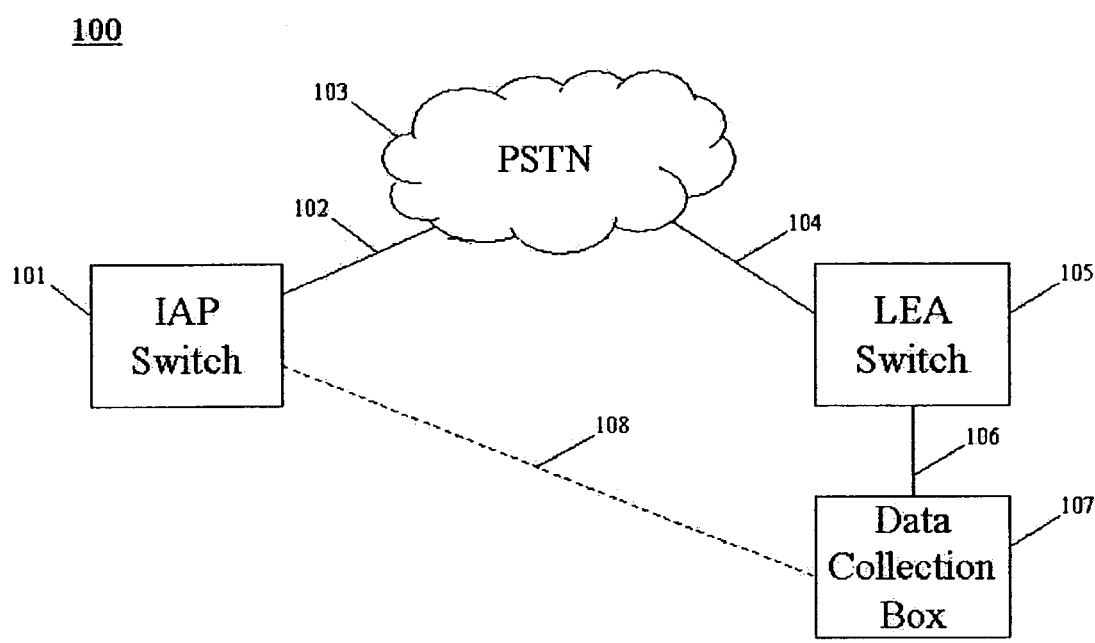
FIG. 1 depicts a communication system in accordance with an exemplary embodiment of the present invention.

A law enforcement data collection system in accordance with the invention includes a law enforcement agency (LEA) data collection box capable of receiving subject call identifying information data in a format specified by the IAP Switch. The data collection box may connect directly to law enforcement end user lines, either analog or ISDN, on the IAP switch, or may be remotely served by an LEA terminating switch, which is any Class 5 end office in the PSTN. The terminating switch does not require any special applications capabilities over and above the termination and switching of a voice-grade call. The terminating switch may be anywhere in the Public Switched Telephone Network PSTN, including in another LATA (Local Access and Transport Area) from the IAP and/or carrier network, thus improving on the current method of surveillance data delivery that requires a negotiated link connection between a local and an inter LATA carrier providing private point to point network communication service to law enforcement.

The switch preferably sends the call identifying information data to the LEA data collection box utilizing the GR-30 standard, GR-30-CORE, Telcordia GR-30-CORE, Issue 2, "Voiceband Data Transmission Interface", December, 1998, herein incorporated by reference. Modifications to the GR-30 standard are implemented to permit the transmission of short messages in multiple related packets to one or more destinations other than the called party destination, and, in the case of law enforcement applications, to meet the specific requirements for transmitting law enforcement CDC Messages in a secure manner to the data collection box. The LEA data collection box and/or IAP switch may optionally communicate control information between the end point and switching node, such as login authentication, heartbeat messages, keep alive messages, or administrative commands, with standard DTMF signaling in accordance with Telcordia, "Local Switching System Generic Requirements: Signaling for Analog Interfaces," GR-506-CORE, June 1996, herein incorporated by reference. DTMF commands are managed at the applications level, and may be provisioned by the service provider as provisioned parameters, or software hard coded or provided in firmware by the IAP Switch manufacturer to support the application. Commands from the data collection box to the IAP may request that a number of administrative functions be performed, such as dump buffers, or resend data, or request that a call content communications path (wire tap) be established, or that a call content communications path be muted. The muting may continue for a specified time period; until the occurrence of a specified call event, such as a call received by a call waiting service or the addition/deletion of a leg to a conference call; or until a further signal is received from the data collection box (or other data receiving device) to un-mute the path. Commands from the data collection box may further request the IAP to substitute delivery DN's, terminate the call, re-dial to another number in case of poor transmission quality, or carry out other functions that are necessary or desirable to support applications useful to law enforcement or other recipients of switching node reporting data.

FIG. 1 depicts a communication system 100 in accordance with an exemplary embodiment of the present invention. Communication system 100 includes IAP (Intercept Access Point) switch 101, Public Switched Telephone Network (PSTN) 103, Law Enforcement Agency (LEA) serving switch 105, and a data collection box 107. Line 108 is an alternative connection when data collection box 107 is connected directly to IAP switch 101 by a local line, analog or ISDN.

Switches 101 and 105 are preferably class 5 "5ESS" switches provided by LUCENT TECHNOLOGIES INC. of Murray Hill, N.J. PSTN 103 is coupled to a plurality of switches, such as IAP switch 101 and LEA serving switch 105, and provides for communication with users connected to the switches. PSTN 103 is coupled to switch 101 via an ISUP or MF trunk 102. LEA switch 105 is a class 5 switch in the PSTN that provides telephone service to line 106. LEA switch 105 is coupled to PSTN 103 via an ISUP or MF trunk 104.

Data Collection box 107 is a server coupled to LEA switch 105 via line 106. Data collection box 107 receives and stores data sent from switch 101 to data collection box 107 via PSTN 103. The data sent by switch 105 includes data generated by the switch. The data to be transmitted may first be stored by the switch, e.g., to buffer data and/or to permit retrieval of data following a link failure. Ideally, delivery occurs in real time, subject to buffering for flow control. Data collection box 107 preferably includes an input port, an output port, a processor, and memory.

An exemplary embodiment of the present invention is as follows. Call Data Channel (CDC) messages are transmitted over the voice band portion of a connection between switch 101 and data collection box 107. Switch 101 can dial out using the PSTN to data collection box 107 connected to the PSTN, or alternately data collection box 107 connected to the PSTN can dial in to IAP switch 101. The connection may pass through tandem trunks or directly connected via a line interface. The typical data collection box interface may be a properly terminated analog 2-wire line (either loop or ground start), ISDN B-channel provisioned for voice, or any other suitable network termination that does not impair the FSK (Frequency Shift Keying) or DTMF (Dual-Tone MultiFrequency) voice band transmission. IAP Switch 101 is preferably capable of both analog 2-wire line and tandem trunk interfaces.

IAP Switch 101 expects data collection box 107 to respond, when so provisioned, using DTMF signal digits, to acknowledge and authenticate the connection setup. The IAP Switch may optionally transmit DTMF signals to the data collection box. DTMF signal digits are DTMF digits preferably in the range of 0-9 and preferably played with a minimum of 50 millisecond (ms) tone generation time, followed by a minimum of 50 ms of inter-digit silence. DTMF signal digits may comprise Negative Acknowledgement (NACK) signals, Acknowledgement (ACK) signals, and login sequences, or pre provisioned digit strings representing commands from the respective system end points. In the preferred embodiment of the present invention, the ACK signal is a DTMF 0 Signal Digit. The NACK signal is preferably a DTMF 1-9 Signal Digit. In the preferred embodiment, the value of the NACK digit indicates the first packet of a message sequence where an error was detected, and from whence re-transmission should commence. Data collection box 107 preferably waits at least 250 ms after receiving the last CDC packet of a CDC message before sending an ACK/NACK to switch 101. Data collection box 107 preferably sends data to IAP switch 101 to support additional command and control functions between IAP switch 101 and collection box 107. TAP Switch 101 may also send DTMF digits to the data collection box to request specific, predefined actions implemented by the applications software/hardware at the data collection box. Some examples of such actions include content circuit failure redirection, turn off message acknowledgment, switch to new content channel DN, and release the line (if the CDC line is connected to a modem that cannot detect on hook, a positive disconnect message is required).

Figure 2A:
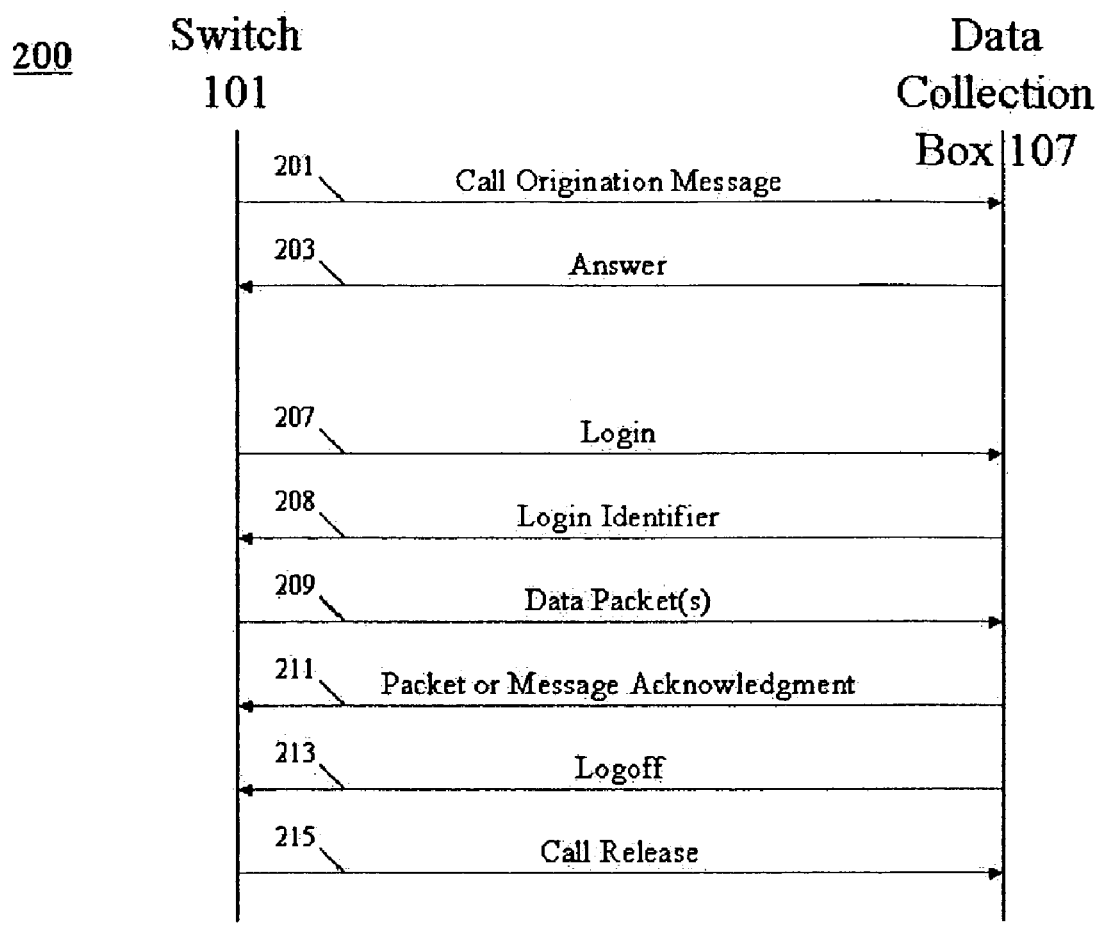
FIG. 2a depicts a call flow of a dial-out call identifying information data exchange between an IAP switch and an LEA data collection box in accordance with an exemplary embodiment of the present invention.

FIG. 2a depicts a call flow 200 of a call session for sending call identifying information from IAP switch 101 to a law enforcement data collection box in accordance with an exemplary embodiment of the present invention. In the embodiment depicted in FIG. 2A, IAP switch 101 is dialing out to data collection box 107 over the PSTN. It should be understood that IAP switch 101 and data collection box 107 send messages via other network elements, such as PSTN 103 and LEA serving switch 105. IAP Switch 101 sends call origination message 201 to the data collection box, alerting of an incoming call. Data collection box 107 sends answer 203. An optional login sequence may occur, where IAP switch 101 sends login 207 and data collection box 107 responds with login ID 208. IAP Switch 101 may optionally send data messages to data collection box 107 using the GR-30 on-hook method of caller ID (data transmission before phone picked-up). Data collection 107 box may, if so programmed, respond to the 'on hook' message at the applications level. Said on hook message delivery takes place prior to the optional login process. If properly logged in, data packets 209 are sent from IAP switch 101 to data collection box 107. Data collection box 107 may acknowledge each packet or wait until the entire data message is received. This is accomplished by sending acknowledgement message 211. A negative acknowledgement may be sent if appropriate, or no acknowledgement, as provisioned by the user. Following completion of sending all data, IAP switch 101 sends logoff message 213 and call release 215 is accomplished.

In the embodiment depicted in FIG. 2a, IAP switch 101 initiates a call to data collection box 107 through PSTN 103 by sending call origination message 201. Call origination message 201 can be sent using well-known call setup procedures such as ISUP (ISDN User Part) trunk signaling or the line signaling protocol (e.g., off hook/power ringing). Call origination message 201 can be triggered by IAP switch 101 determining that a call identifying information buffer memory has reached a predetermined level. Alternatively, IAP switch 101 can make its determination to dial out to data collection box 107 based upon receiving a request to dial out from the law enforcement system, e.g., data collection box 107. The request will specify one or all cases for which call identifying information may be delivered to a specific law enforcement agency. Alternately, IAP switch 101 can send call origination message 201 based upon the expiration of a provisionable timer. Note that, in accordance with the invention, provisionable parameters may be modified based on input (controls signals) from data collection box 107, as previously discussed. A further alternate embodiment for triggering dial-out is a manual maintenance input message that can be entered at IAP switch 101 to execute a connection test message directed to the collection box.

IAP switch 101 dials out to data collection box 107 by dialing a directory number stored in a database list at switch 101. One aspect of the present invention is that switch 101 can have a list of directory numbers (DN) associated with the law enforcement system or other data recipient. If the first directory number is busy or fails to answer in a pre-determined amount of time, IAP switch 101 preferably dials out to a second directory number stored at IAP switch 101. IAP switch 101 may also be programmed to monitor traffic on a specific link going to a law enforcement agency or other user of the data. If the traffic (buffer memory content) exceeds a provisioned threshold or capacity, IAP switch 101 will select an additional DN from a stored list (if provisioned), thus assuring that the link will not be overloaded.

Collection box 107 sends answer supervision 203 to IAP switch 101.

In the embodiment depicted in FIG. 2a, IAP switch 101 sends a login message 207 to data collection box 107. In the preferred embodiment, IAP switch 101 sends login message 207 utilizing FSK signaling. Data collection box 107 replies with a pre-determined login identifier message 208. This serves to authenticate the law enforcement data collection system and to authorize the IAP switch to forward the subject call identifying information to the equipment. In the preferred embodiment of the present invention, data collection box 107 sends login identifier message 208 utilizing Dual-Tone MultiFrequency (DTMF) signals. In an alternate embodiment of the present invention, collection box 107 sends login identifier message 208 utilizing FSK signaling.

Login message 207 is preferably a pre-formatted CDC ConnectionTest message in accordance with J-STD-025/025A, or other predetermined message utilizing the same encoding scheme as all other CDC messages. Login identifier message 208 is preferably a DTMF string comprised of a length digit plus a login ID. The length digit preferably comprises a DTMF Signal Digit corresponding to the total number of login digits sent, including the length digit. In the preferred embodiment of the present invention, the login ID is three digits long with values from 0-9 and corresponds to the ID of IAP switch 101. The length digit in this example is four digits long. For example, if the Login ID is "098," the length would be 4 (three login digits plus one digit for the length itself). In this example, the transmitted login sequence would be "4098."

Login message 207 preferably comprises a Case Identity field, Time Stamp field, and a Memo field. The Case Identity field is set to the identity of the current case. If multiple cases are provisioned to use the link, any single valid case identity can be used, or none based on provisioning parameters. The Time Stamp field is set to the current date and time. The Memo field is preferably set to "V_ID," or other predetermined identity memo recognized by data collection box 107.

It is preferred that IAP switch 101 only sends login message 207 when provisioned with a login ID, in order to conserve bandwidth. IAP switch 101 can be provisioned to send login message 207 automatically upon link initialization or on demand. In the preferred embodiment, collection box 107 will ACK/NACK login message 207 just as any other message, before proceeding to send login ID message 208.

Switch 101 sends a data packet message 209 to data collection box 107, preferably using FSK signaling. In an exemplary embodiment of the present invention, data packet message 209 includes call identifying information. Data packet message 209 preferably includes a plurality of data packets depending on the length of the message to be delivered to law enforcement, and the size of the GR-30 packet supported by IAP switch 101. Each of the data packets preferably includes a field that indicates the position (sequence number) of the data packet in the CDC message. For example, the field can indicate if the data packet is the first data packet in the message, the last data packet in the message, or an intermediary data packet. The purpose of including the packet number is to permit data collection box 107 to perform error detection, and to permit a NACK back to a specific packet number in a sequence, thus reducing re-transmission time of negatively acknowledged packets. This will also facilitate the function of data collection box 107 to reassemble the series of packets into a single CDC message, as well as know when the last packet is received.

In the preferred embodiment of the present invention, IAP switch 101 sends data packet message 209 utilizing Frequency Shift Keying. In a further exemplary embodiment of the present invention, switch 101 sends data packet message 209 to data collection box 107 utilizing GR-30 signaling. GR-30 signaling is available on most class 5 switches, and therefore provides a least-cost method for transmitting short data messages over analog lines. The GR-30 user data payload will be used in a new application-specific way. The present invention combines the structure of SDMF (Single Data Message Format), including checksum, with the unrestricted payload of GDMF (Generic Data Message Format). For example, it will support the position byte. The GR-30 packet will support CDC message fragments, thus enabling data greater than 255 bytes to be sent.

Data Packet 209 is a complete or partial CDC message sent in a SDMF frame. An SDMF frame can preferably include up to 255 payload bytes. In the situation where switch 101 cannot send a maximum SDMF message or a CDC message exceeds 255 bytes, switch 101 preferably sends a fragment of the CDC message to the data collection box 107. Switch 101 preferably sends fragments of CDC messages in strict first-in, first-out (FIFO) order. That is, switch 101 sends the fragments in order of a CDC message. Each IAP switch supports a GR-30 message length less than 255 bytes; however, with the ability to send CDC messages in fragmented packets, the entire CDC message may be sent to law enforcement using GR-30 without regard to the message length. This allows data collection box 107 to reassemble the CDC fragments by buffering and concatenating CDC fragments until a complete CDC message is received. The number of data packets will increase or decrease depending on the size of the payload and the length of the GR-30 message supported by the IAP switch.

Switch 101 can encrypt data packet 209 prior to sending to the law enforcement data collection box system. Switch 101 preferably utilizes the Digital Signature Algorithm (DSA) to encrypt data packet 209. Data Collection box 107 will be provisioned for the data encryption scheme selected by IAP switch 101 so that messages may be de-encrypted and displayed. Data Collection box 107 may optionally store all information in the encrypted format.

If optionally set, the data collection box 107 sends a packet acknowledgement message 211 to switch 101 in response to data packet 209. Packet acknowledgement message 211 is preferably sent to switch 101 utilizing Dual-Tone MultiFrequency (DTMF) signals.

Packet acknowledgement message 211 preferably includes a status indicator that indicates whether data packet message 209 was received properly at the data collection box 107. If packet acknowledgement message 211 indicates that data packet 209 was received in error, switch 101 will resend the packets that were not properly received.

Packet acknowledgement message 211 is optional in the case where IAP switch and/or data Collection Box hardware, software, or economic concerns make the use of ACK/NACK undesirable, at the expense of lower data integrity.

Switch 101 computes a checksum word for data packet message 209 and appends the checksum word to data packet message 209. At data collection box 107, the checksum word is recomputed and compared to the checksum word sent in data packet message 209. Data packet message 209 is considered to be error-free if both values are identical. Although the preferred embodiment of the present invention performs error detection, the preferred embodiment does not include inherent (e.g., forward) error correction, which may be supported at the application layer. Instead, error correction is preferably accomplished by resending packets that have been received in error. It may be noted that some level of error correction may be accomplished at data collection box 107 since the messages are well-defined, and some of the information, in the case of the law enforcement surveillance application, such as case ID and subject DN (Directory Number) are known to the data collection box application. Minor errors may be corrected based on pre-knowledge of the message content.

In the preferred embodiment, switch 101 expects an ACK or NACK message from collection box 107 for each CDC message sent. A message comprises a series of one or more packets. Collection box 107 may optionally ACK/NACK each packet; however, this has a negative impact on the data throughput. Switch 101 awaits an acknowledgement before starting to send the next CDC message. Collection box 107 responds with an ACK if the CDC message can be assembled from the CDC packets (fragments) and the checksum was correct for all CDC packets used to send the CDC message. Collection box 107 sends a NACK message for the first failing CDC packet otherwise. The NACK signal digit number represents the CDC packet number in the entire CDC message that was first found to be in error. When Switch 101 receives a NACK n Signal Digit, switch 101 retransmits the $n^{th}$ to the last CDC packets in the current CDC message.

If data packet 209 was received properly, collection box 107 sends an ACK (ACKnowledgement) message 211 to switch 101. The ACK signal is preferably a DTMF 0 Signal Digit, but may be any digit or digits well known to the IAP switch and the data collection box.

If data packet 209 was not received properly, collection box 107 sends a NACK (Negative ACKnowledgement) message to switch 101. If a preset time elapses before receiving a ACK or NACK, IAP switch 101 assumes the message was not received properly and follows the same process as if a NACK were received. This process of responding to a NACK or timeout may be repeated a finite number of times.

The NACK signal is preferably a DTMF 1-9 Signal Digit. The number represents the first erroneous absolute packet number of the current CDC message. For example, if the CDC message takes five CDC packets for transmission, and the third packet has a failed checksum, the collection box NACKs the CDC message by sending a DTMF 3 Signal Digit to switch 101. Switch 101 then retransmits the 3rd, 4th, and 5th CDC packets of the CDC message. Further, if the retransmission had an error in the second retransmitted packet (which corresponds to the fourth original CDC packet), the collection box sends a DTMF 4 Signal Digit as a NACK for the second transmission.

In the scenario where a CDC message takes more than nine CDC packets for transmission and the tenth or greater CDC packet is in error, collection box 107 preferably sends a DTMF 9 Signal Digit as a NACK. Switch 101 then starts retransmission with the ninth CDC packet of the message. For example, if a CDC message takes twelve CDC packets for transmission and the eleventh packet has a failed checksum, collection box 107 NACKs the transmission by sending a DTMF 9 Signal Digit. Switch 101 then resends the ninth, tenth, eleventh, and twelfth CDC packets. Assuming that the eleventh packet failed the second time as well, collection box 107 NACKs the retransmission by sending a DTMF 9 Signal Digit. Switch 101 then re-retransmits the ninth, tenth, eleventh, and twelfth CDC packets. If the CDC message must be divided into a large number of packets, the protocol may be expanded to 2 digits or more.

In an alternate embodiment of the present invention, if collection box 107 does not support partial retransmission, collection box 107 NACKs a CDC message using a DTMF 1 Signal Tone. IAP switch 101 then retransmits the entire CDC message.

If data packet 209 was encrypted by switch 101 prior to sending, collection box 107 preferably decrypts data packet 209 after reception. Optionally, collection box 107 may store the data in encrypted format for later recovery and analysis. The application may specify that the whole packet be encrypted and not just the user data portion.

IAP switch 101 or collection box 107 may stop transmission at any necessary time by performing a standard PSTN call disconnect procedure. If buffered data remains or continues to accumulate at IAP switch 101, the connection may be re-established at a later time, e.g. once a fault condition clears. Messages are preferably stored in an IAP switch buffer until received and positively acknowledged. Methods for managing the overflow buffer may be employed to conserve memory, and are based on user specifications.

Figure 2B:
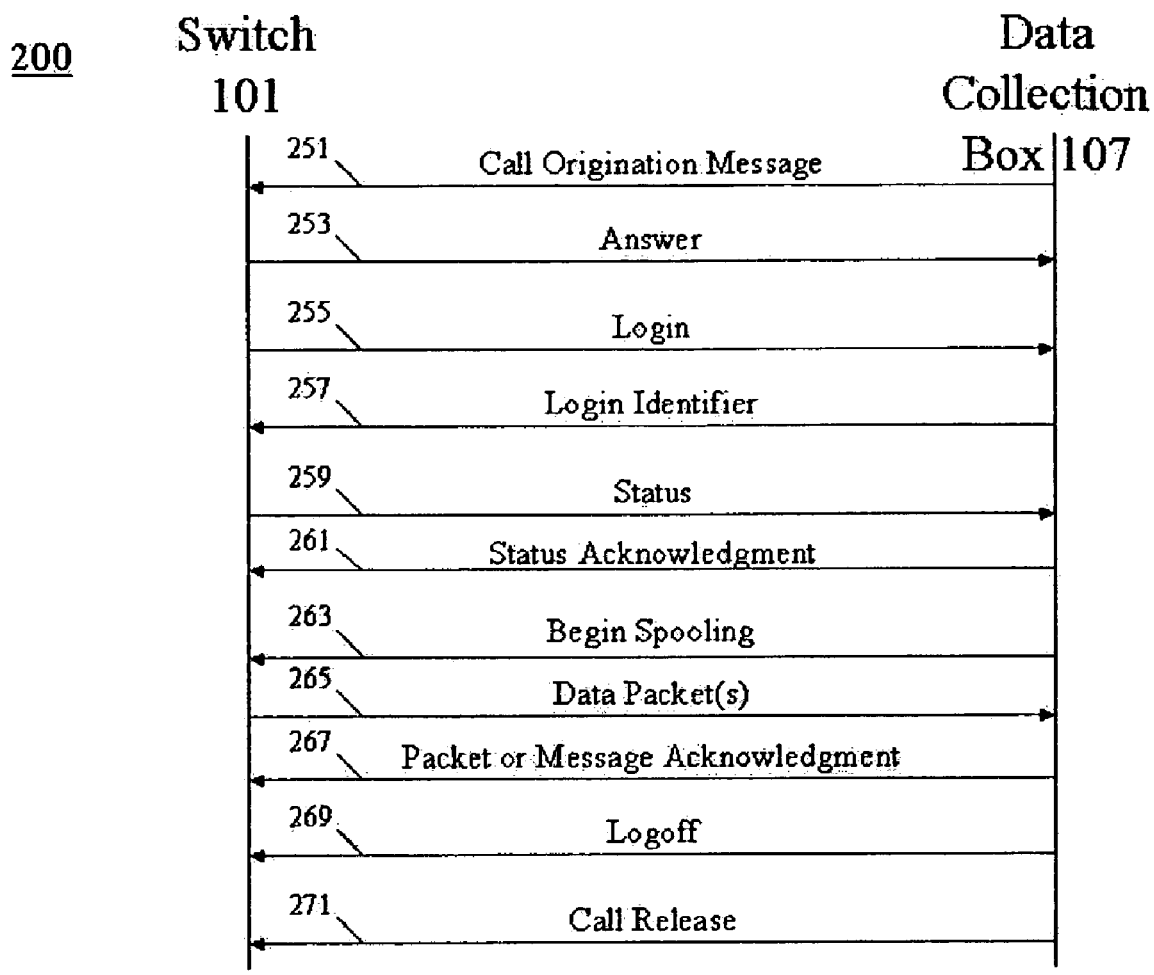
FIG. 2b depicts a call flow of a data collection box dial-in call identifying information data exchange between an IAP switch and an LEA data collection box in accordance with an exemplary embodiment of the present invention.

FIG. 2b depicts an alternative embodiment, in which data collection box 107 dials in to IAP switch 101 using a pre-provisioned DN. The call flow and associated events are similar to those of FIG. 2a. In FIG. 2b, Data Collection Box (CB) 107 initiates a call 251 to IAP switch 101 using a specially translated directory number. The special number, which may be one of multiple numbers assigned at IAP switch 101 and provisioned at Data Collection Box 107 to be associated with a specific data user, e.g. law enforcement agency, and is associated with the capability to deliver Call Identifying Information to a Law Enforcement Data Collection System, and therefore may not have any associated telephone equipment. The ability to associate a directory number with a service rather than telephone equipment is a procedure well known to those skilled in the art. IAP switch 101 recognizes the special service (login) request, and returns answer supervision 253 to Data CB 107. IAP Switch 101 then initiates the optional login exchange (255, 257) identical to that previously described in FIG. 2A (207, 208). Preferably, IAP switch 101 transmits information about the quantity and nature of data buffered in memory for delivery to Data CB 107 using status message 259. Preferably, status message 259 is encoded in GR30 FSK. Preferably, Data CB 107 sends acknowledgment 261 to IAP switch 101, indicating that the status message was received without error. Data CB 107, or a human operator controlling Data CB 107, now has enough information to determine whether it is advantageous to collect accumulated data, remain connected in anticipation of new data, or disconnect with the option to retry at a later time. If Data CB 107 determines that it is advantageous to disconnect, it proceeds to logoff (269). However, if Data CB 107 determines that it is advantageous to collect any stored data, or await new data, Data CB 107 transmits request 263 to IAP switch 101 to begin spooling. When spooling is active, IAP switch 101 will transmit any buffered data, and then stay connected, transmitting new data as it becomes available.

Transmission of data packets and acknowledgments (265, 267) proceed in a manner identical to FIG. 2a (209,211).

Figure 3:
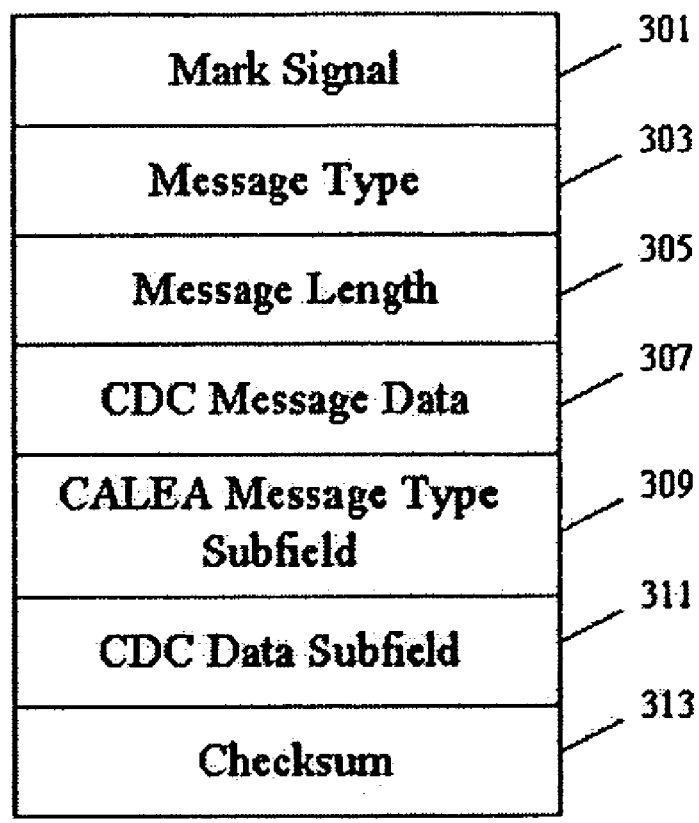
FIG. 3 depicts a GR-30 data packet in accordance with the invention that encapsulates all or a fragment of a CDC Call Identifying Information Message or other data message.

Data CB 107 has the option to logoff and disconnect (269,271) in a manner identical to FIG. 2a (213,215). (This should be a new paragraph) FIG. 3 depicts a GR-30 data packet 300 that encapsulates all or a fragment of the CDC Message. Data packet 300 comprises Mark Signal 301, Message Type 303, Message Length 305, CDC Message Data 307, CALEA Message Type Sub-field 309, CDC Data Sub-field 311, and Checksum 313, necessary to meet the requirements of law enforcement. Other applications may include additional information within the GR-30 format structure.

Mark Signal 301 comprises 80 bits of continuous mark in accordance with the GR-30 standard.

Message Type 303 comprises 8 bits of information in accordance with the GR-30 standard. Message type 303 is preferably set to the Calling Name Display (CND) Message Type value of Hexadecimal 04.

Message Length 305 comprises 8 bits and is preferably set to the number of bytes in the CDC Message. In the preferred embodiment, message length 305 excludes the message type, message length, and Checksum value fields.

As depicted in FIG. 3, CDC Message Data field 307 preferably comprises two sub-fields, the CALEA Message Type and the CDC Data. The CALEA Message Type preferably includes 8 bits, in the first byte of the user data field ("CDC Message Data"). The CALEA message type preferably has one of four values: CALEA CDC Begin Packet, CALEA CDC Continue Packet, CALEA CDC End Packet, or single packet type signified by "$". CALEA Message Type Sub-field 309 preferably comprises 8 bits in accordance with the GR-30 standard. Three message types are defined, "CALEA CDC Begin Packet," "CALEA CDC Continue Packet," and "CALEA CDC End Packet." CALEA Message Type Sub-field 309 is set to "CALEA CDC Begin Packet" when the CDC message is the first of multiple CDC packets. The CALEA CDC Begin Packet preferably is set to a value of ASCII "*", which is the equivalent of a Hexadecimal 2A. CALEA Message Type Sub-field 309 is set to "CALEA CDC Continue Packet" for CDC messages that are not the first or only CDC packet or the last CDC packet. CALEA CDC Continue Packet preferably is set to a value of ASCII "2"-"9", which are the equivalents of Hexadecimal 32 through 39, respectively. The "CALEA CDC Continue Packet" is preferably set to the ASCII representation of the CDC packet number in the range 2-9 for the second to ninth packets transmitted, and to ASCII '9' for a packet whose packet number is greater than nine. CALEA Message Type word 309 is set to "CALEA CDC End Packet" when the CDC message is the last or only CDC packet. CALEA CDC End Packet preferably is set to a value of ASCII "#", which is the Hexadecimal equivalent of 23. A fourth message type is set to a value of ASCII "$" signifying that a single GR-30 packet contains the entire CDC Message.

CDC Data Sub-field 311 is preferably a CDC message formatted in accordance with ASN.1 CDC defined in J-STD-025/J-STD-025A. In the scenario where the message is too large to fit into a single data packet, CDC Data Sub-field 311 is a fragment of a CDC message in ASN. 1 CDC Format defined in J-STD-025/J-STD-025A.

Checksum 313 preferably comprises 8 bits that preferably comprises the two's complement of the modulo 256 of the binary representation sum of all the other words in the message, including message type and length as specified in the GR-30 specification.

Figure 4:
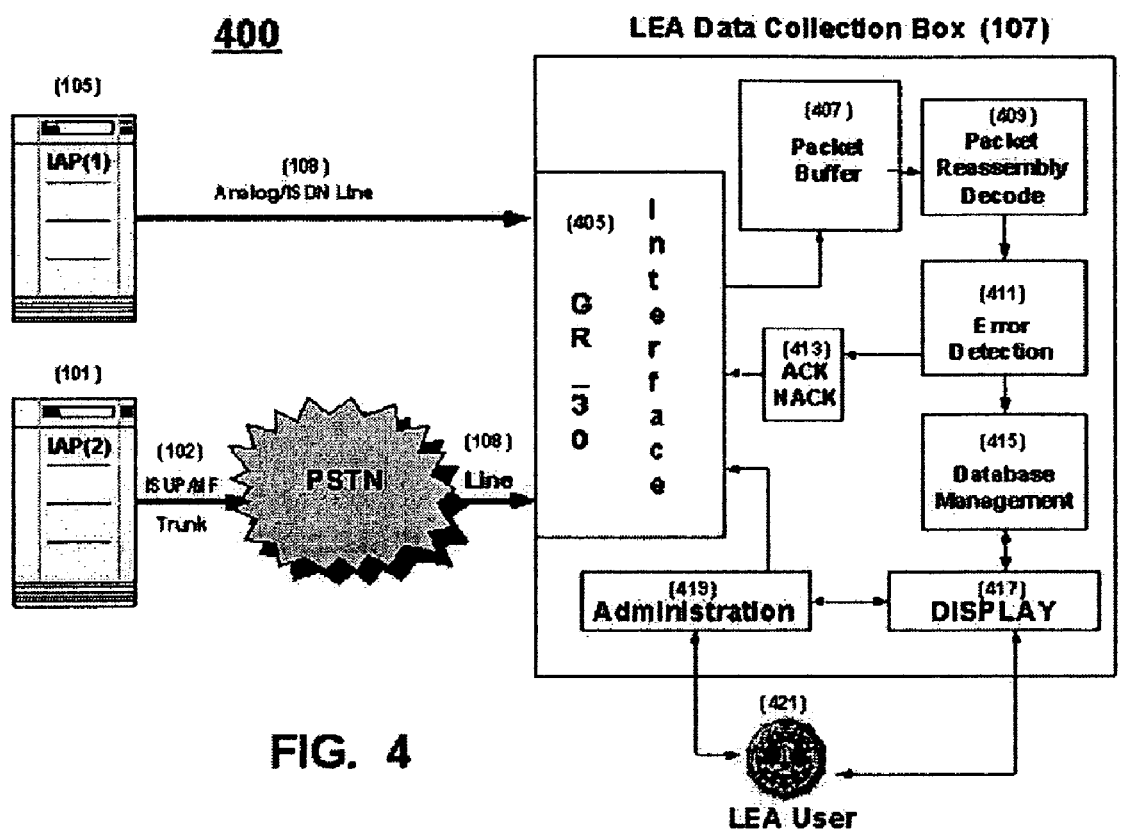
FIG. 4 depicts a data collection box demonstrating functionality for a surveillance data delivery application using GR-30 coupled to a plurality of switches in accordance with an exemplary embodiment of the present invention.

FIG. 4 depicts a collection box 107 coupled to a plurality of switches 101 and 105 in accordance with an exemplary embodiment of the present invention. IAP switch 105 is directly connected over a line interface 108 to a collection box 107 using a GR-30 interface 405. The interface sends individual GR-30 packets to a packet buffer 407 that stores the packets until all packets comprising a CDC message are received. When the message is received, e.g. last packet received, the packet reassembly and decode function 409 is employed. When the message is assembled, and the message length is verified, the message is reviewed by the error detection function. Failed messages will cause the NACK function 413 to signal for re-send. If the message is without error, the ACK function 413 alerts IAP switch 105 to send the next message.

CDC Messages are forwarded to a database function 415 and formatted for display to the user 421. Law enforcement user 421 interfaces with the collection box using an administration function 419 that provides access to the display function and the database. The above is repeated using IAP switch 101, however, access to collection box 107 requires PSTN 103 over trunks 102, and terminating to collection box 107 over a line interface 108.

Figure 5:
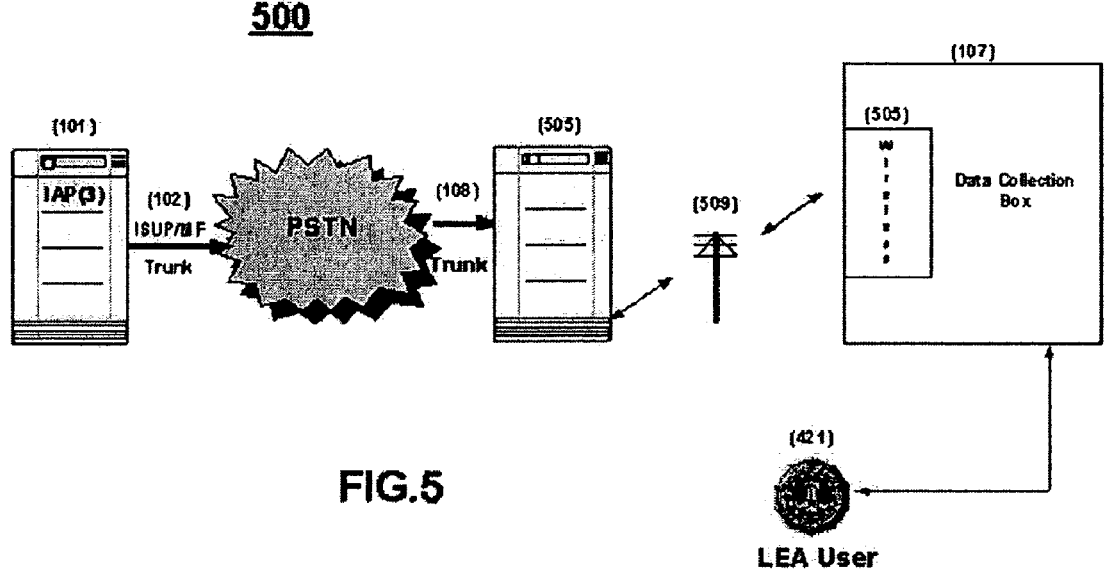
FIG. 5 depicts a communication system in accordance with an exemplary embodiment of the present invention that includes a wireless switch connection to the data collection box and a wireless data collection box interface.

FIG. 5 depicts a communication system 500 in accordance with an exemplary embodiment of the present invention that includes a wireless connection and collection box interface. FIG. 5 shows elements of FIG. 4 with trunk 102 egress from IAP switch 101 through PSTN 103 to a wireless switch 503 and finally to data collection box 107 using a wireless radio link 509. Data Collection box 107 is equipped with a wireless interface that serves as a front end to data collection box 107. Interface 505 transmits the CDC GR-30 packets to GR-30 interface 505. Data Collection box 107 then functions as depicted in FIG. 4.

Figure 6:
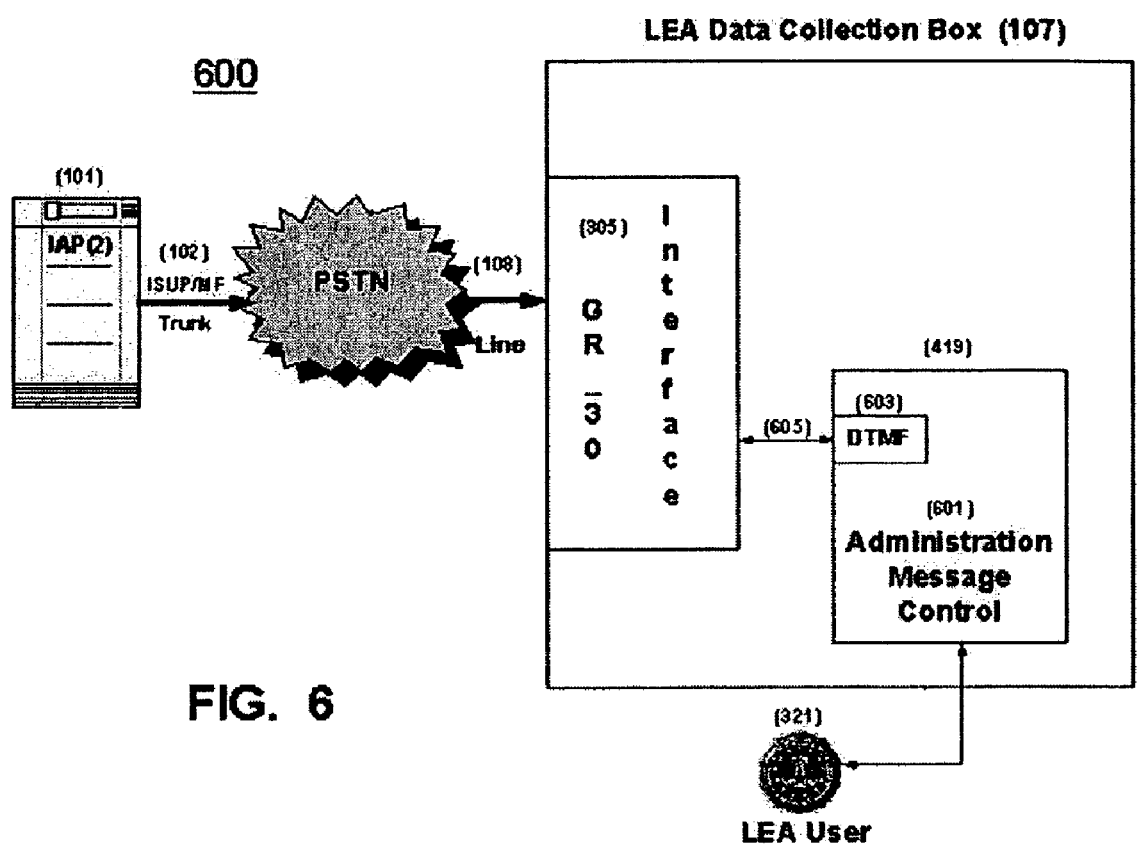
FIG. 6 depicts a communications system in accordance with an exemplary embodiment of the present invention that includes a data collection box with application support for IAP switch and data collection box command and control in accordance with an exemplary embodiment of the present invention.

FIG. 6 depicts data collection box 107 with application support for IAP switch and data collection box command and control in accordance with an exemplary embodiment of the present invention. Data Collection box 107 includes application support for IAP switch 101 and data collection box command and control. Administrative function 419 includes an administrative Message Control function 601 that communicates LEA User commands to IAP switch 101 via DTMF function 603. Specific commands to request actions and/or information from IAP switch 101 are sent from user 421 to IAP switch 101. IAP switch 101 responds appropriately based on pre-defined commands functions. Message bus 605 relays DTMF signaling from the GR-30 interface to the DTMF send/receive function 603).

Figure 7:
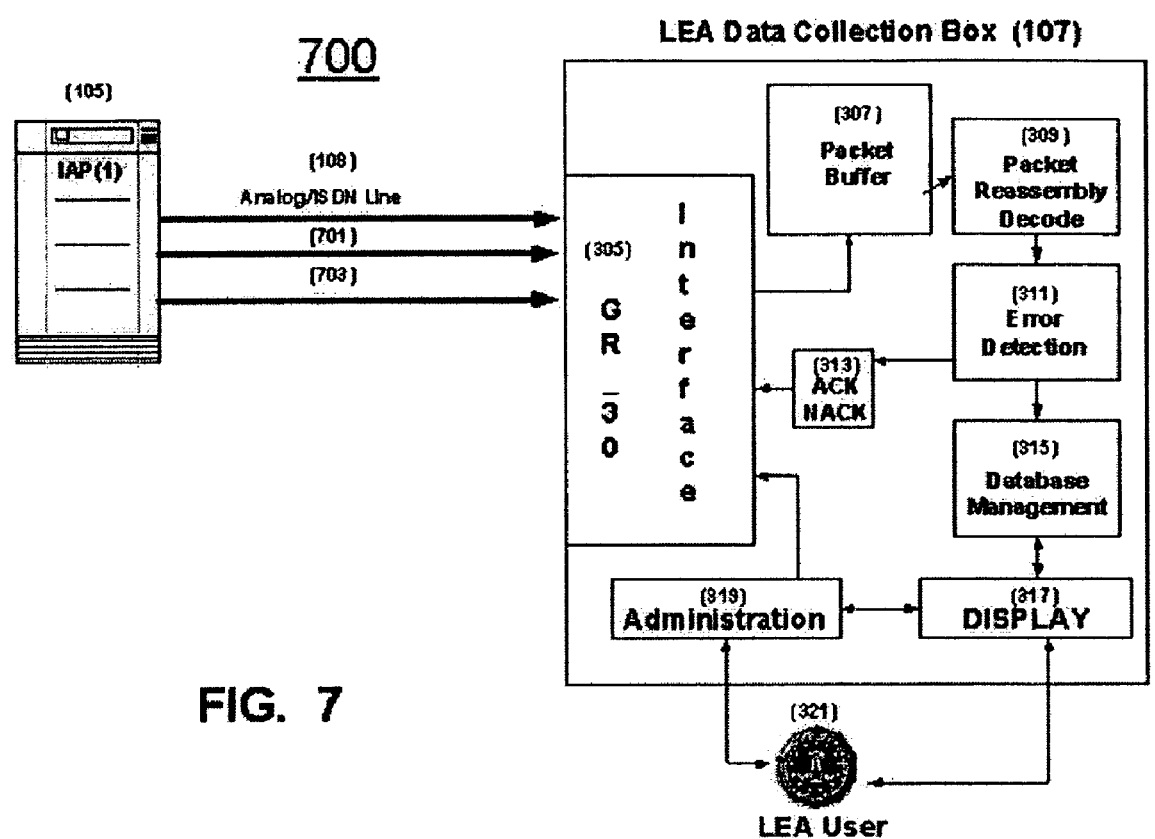
FIG. 7 depicts a communications system in accordance with an exemplary embodiment of the present invention that includes multiple access lines, analog or ISDN, between an IAP switch and a data collection box serving a single law enforcement agency in accordance with an exemplary embodiment of the present invention.

FIG. 7 depicts a CDC Message delivery system 700 utilizing multiple access lines between IAP switch 101 and data collection box 107 in accordance with an exemplary embodiment of the present invention. FIG. 7 depicts a typical line access from the IAP switch 101 to data collection box 107, further showing multiple access lines 701 and 703. Additional lines provide for means to manage traffic overflow, allowing IAP switch 101 to spread the data traffic over multiple lines based on overflow algorithms responsive to an overflow condition of buffer memory. IAP switch 101 manages CDC message traffic over the provisioned links by opening additional, available links if required and previously provisioned. Additional links 701 and 703 may be used in cases of link 108 failure. Links 701 and 703 provide redundant delivery paths to the data collection function. An LEA user may, using DTMF Command and Control, request CDC Message delivery over a specific link, for example, due to port congestion or failure on the data collection box, or noise on the line that impacts data error rates. The number of lines provisioned to an individual data collection box is limited only by the engineered capacity of the box and the support provided by the application layer.

Figure 8:
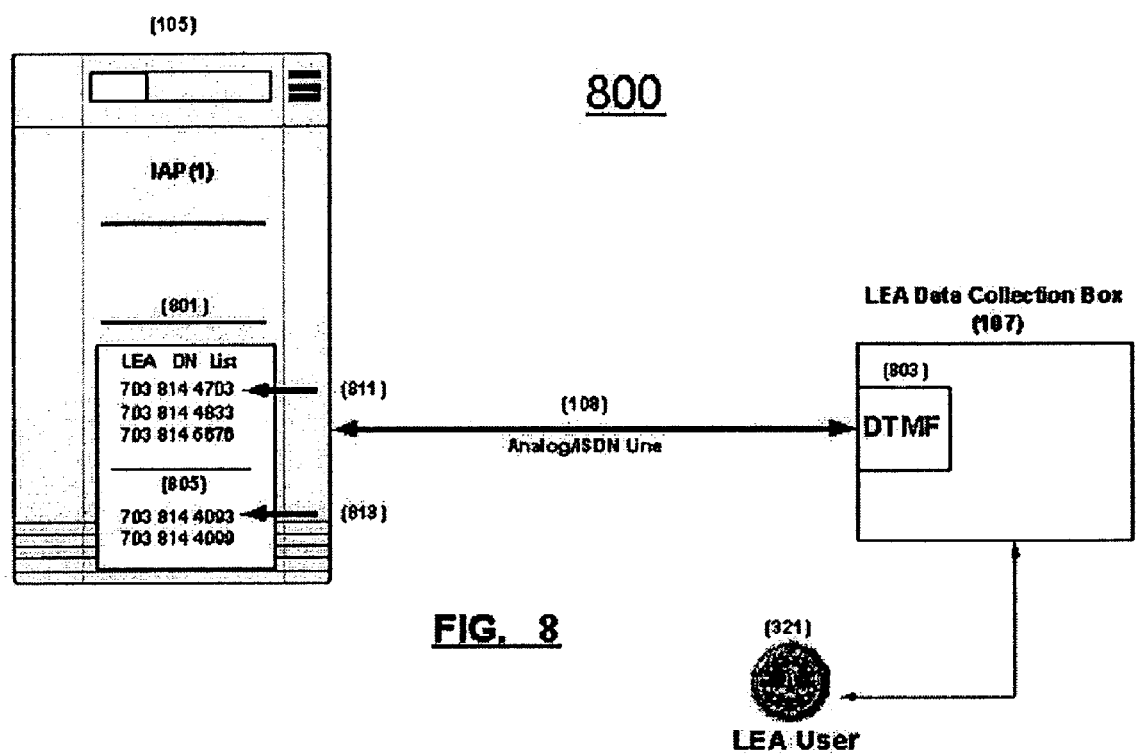
FIG. 8 depicts a communications systems in accordance with an exemplary embodiment of the present invention that includes an IAP switch provisioned with a plurality of alternative law enforcement destination numbers in accordance with an exemplary embodiment of the present invention.

FIG. 8 depicts an IAP switch 105 provisioned with a plurality of alternative destination numbers, stored in memory lists 801, to law enforcement in accordance with an exemplary embodiment of the present invention. IAP switch 105 may be programmed to load share the CDC message traffic over multiple directory numbers (DN's), or IAP switch 105 may be provisioned to be responsive to commands from data collection box 107 using a DTMF generator 803. FIG. 8 depicts a pointer 811 to DN Group 2, DN 1 (703 814 4093) as the primary delivery DN to law enforcement. Traffic balancing will utilize DN 2 (703 814 4833). The first list 801 of three delivery DN are provisioned for another LEA, and in this example there are three DN's used for load balancing and back up. List 805 has been provisioned for a second law enforcement agency, using primary delivery DN 813.

The present invention thereby provides a method and apparatus (that may be implemented with software/hardware upgrades/modifications to existing equipment) for delivering Call identifying information from an IAP switch to a Law Enforcement Data Collection box that is economically advantageous over state of the art implementations that rely on engineered ISDN circuits, such as Permanent Virtual Circuits, PVC. The invention provides for reliable data transmission by the use of checksums and ACK/NACK signals. Circuits used are widely available in the PSTN and telecommunications industry. Provisioning of the system described by this invention is advantageous over ISDN or X.25 Digital Data Circuits in that it is simpler and hence less time consuming to set up. Also, the data is delivered over widely available PSTN voice-grade connections, which means the data collection box may be situated anywhere in the PSTN in relation to the IAP switch without designing and implementing a "nailed-up" private delivery network. The state of the art ISDN delivery is limited by ISDN line loop length limits and/or local access to the Public Switched Data Network, which is not ubiquitous. Extension to the ISDN loop limitation, for example employing Basic Rate Extension Cards (BRITE), is extremely expensive, and introduces new engineering complexity.

While this invention has been described in terms of certain examples thereof, it is not intended that it be limited to those examples and the above application description, but rather encompass various other applications, embodiments, variations and modifications that fall within the scope and spirit of the claims that follow.

The invention claimed is:

1. A voice grade line compatible method for selectively transmitting data generated by a switching node of a telecommunications network to a data receiving device connected to the network, the method comprising:
    generating data at said switching node;
    transmitting to said data receiving device, over an analog network link, analog signals forming reporting messages corresponding to said data, each message comprising a plurality of data packets arranged according to a predetermined data packet framework;
    receiving at said switching node control signals originating as analog signals sent from said data receiving device, said control signals pertaining to operation of said switching node; and
    operating said switching node in accordance with the control signals received from the data receiving device;
    wherein a said control signal received from said data receiving device includes a request to said switching node to retransmit a said reporting message to data receiving device, and said switching node retransmits a said reporting in response to said request.

2. A method according to claim 1, wherein said reporting messages include a call identifying message pertaining to a call placed through said switching node to or from a user terminal serviced by the switching node.

3. A method according to claim 2, wherein the analog signals forming said call identifying reporting messages comprise Frequency Shift Keying (FSK) signals.

4. A method according to claim 2, wherein said switching node transmits said call identifying message to said data receiving device in response to said call being placed through the switching node.

5. A method in accordance with claim 2, wherein said call identifying message data is stored in a buffer memory and said control signals include a signal requesting the switching node to start spooling said call identifying message data from said buffer memory.

6. A method in accordance with claim 5, wherein the control signals comprise Dual-Tone Multi-Frequency (DTMF) signals.

7. A method in accordance with claim 5, the method further comprising the step of transmitting a buffer memory status message to the data receiving device.

8. A method in accordance with claim 2, wherein a said control signal received from said data receiving device includes a request that the switching node establish a call content communication path, and said switching node establishes a call content communication path in response to the request.

9. A method in accordance with claim 8 wherein a said switching node mutes the call content communication path in response to a mute request signal received from said data receiving device.

10. A method according to claim 1, wherein a said control signal received at said switching node initiates said transmitting of a said reporting message to the receiving device.

11. A method according to claim 1, wherein a said control signal received at said switching node causes said switching node to transmit a said reporting message to a second data receiving device connected to said network.

12. A method in accordance with claim 1, wherein the control signals comprise Dual-Tone Multi-Frequency (DTMF) signals.

13. A method in accordance with claim 1, wherein the analog signals forming said reporting messages comprise Frequency Shift Keying (FSK) signals.

14. A method in accordance with claim 13, wherein said predetermined data packet framework comprises a GR-30 protocol framework.

15. A method according to claim 1, wherein a said control signal received at said switching node includes an indication of whether there was an error in said data receiving device receiving one or more data packets of a reporting message, and in the event of an error, said method further includes the step of generating, at said switching node, a further signal retransmitting at least the data packet(s) indicated by said control signal to be faulty.

16. A method in accordance with claim 15, wherein each of the plurality of data packets forming a reporting message includes an indication of whether the data packet is the last data packet of the respective reporting message.

17. A method in accordance with claim 15, wherein each of the plurality of data packets forming a reporting message includes an indication of whether the data packet is the first data packet of the respective reporting message.

18. A method in accordance with claim 15, wherein each of the plurality of data packets forming a message are individually identifiable by labels associated therewith.

19. A method in accordance with claim 1, wherein prior to sending the reporting message, the switching node dials out to the data receiving device.

20. A method in accordance with claim 19, wherein prior to dialing out to the data receiving device, the switching node determines that a buffer memory has been filled with reporting message data to a predetermined level.

21. A method in accordance with claim 19, wherein prior to dialing out to the data receiving device, the switching node receives a request to dial out to the data receiving device.

22. A method in accordance with claim 19, wherein prior to dialing out to the data receiving device, the switching node determines that a timer has expired.

23. A method in accordance with claim 19, wherein the step of dialing out to the data receiving device comprises dialing out to a Directory Number included in a list of Directory Numbers stored at the switching node.

24. A method in accordance with claim 19, wherein the switching node dials out to the data receiving device using an alternative Directory Number, in response to detection of a reporting message buffer overload condition at the switching node.

25. A method in accordance with claim 1, further comprising transmitting to said data receiving device, over said analog network link, a signal requesting the data receiving device to execute a specified application functionality.

26. A voice grade line compatible method for selectively receiving data generated by a switching node of a telecommunications network, the method comprising:
   receiving, at a data receiving device connected to said network, analog signals comprising a plurality of data packets arranged according to a predetermined data packet framework and transmitted over an analog network link;
   assembling said data packets to form reporting messages corresponding to data generated at said switching node;
   transmitting control signals originating from said data receiving device as analog control signals destined for said switching node, to thereby control an operational aspect of said switching node; and
   performing error checking on data packets of reporting messages received at the data receiving device, wherein, upon detection of an error in a data packet of a reporting message received from the switching node, said analog control signals include a retransmit request signal requesting said switching node to retransmit at least a portion of a said reporting message.

27. A method according to claim 26, further comprising storing reporting messages received at said data receiving device.

28. A method in accordance with claim 26, wherein the control signals transmitted by said data receiving device include signals for logging into the switch, and a request to the switching node to start spooling reporting message data stored in a buffer memory.

29. A method in accordance with claim 28, further comprising the step of receiving, at said data receiving device, a buffer memory status message transmitted by said switching node.

30. A method according to claim 26, wherein said reporting messages comprise call identifying messages pertaining to a call placed through the switching node to or from a user terminal serviced by said switching node.

31. A method in accordance with claim 26, wherein the control signals transmitted by the data receiving device comprise Dual-Tone MultiFrequency (DTMF) signals.

32. A method in accordance with claim 26, wherein the analog signals received by the data receiving device comprise Frequency Shift Keying (FSK) signals.

33. A method in accordance with claim 26, wherein said retransmit request signal is sent immediately after each detection of a data packet error.

34. A method in accordance with claim 26, wherein said retransmit request signal is not sent until after all data packets of a respective reporting message are received by the receiving device.

35. A method in accordance with claim 26, wherein said control signals include an instruction to store an alternative Directory Number to be used by said switching node in transmitting said reporting messages.

36. A method in accordance with claim 26, wherein said control signals include signals for causing said switching node to select a Directory Number from a list of stored Directory Numbers for use in transmitting said reporting messages.

37. A method in accordance with claim 26, further comprising receiving, at said data receiving device, a control signal sent by said switching node over said network link and, in response to said control signal, executing a specified application functionality.

38. A method in accordance with claim 26, wherein said control signals comprise a signal requesting that said switching node establish a call content communication path.

39. A method in accordance with claim 38, wherein said control signals further comprise a mute signal for requesting that the switching node mute the call content communication path established by said switching node.

40. A method in accordance with claim 39, wherein said mute signal controls the switching node to mute said call content communication path for a predetermined period of time, and to subsequently un-mute said path.

41. A method in accordance with claim 39, wherein said mute signal controls the switching node to mute the call content communications path until said switching node is instructed by said receiving device to un-mute the path.

42. A method in accordance with claim 39, wherein said mute signal controls the switching node to mute the call communication path until the occurrence of a specified call event, whereupon said path is un-muted.

43. A voice grade line compatible data receiving device for selectively receiving data generated by a switching node of a telecommunications network, the device comprising:
   a receiver for receiving analog signals transmitted over an analog network link, said signals comprising a plurality of data packets arranged according to a predetermined data packet framework;
   means for assembling said data packets to form reporting messages corresponding to data generated at said switching node;
   a transmitter for transmitting control signals originating from said data receiving device as analog signals n destined for said switching node, to thereby control an operational aspect of said switching node; and
   means for performing error checking on reporting messages received by data receiving device, and wherein, upon detection of an error in a said reporting message, said transmitter transmits a retransmit request signal requesting said switching node to retransmit at least a portion of said reporting message.

44. A data receiving device according to claim 43, further comprising a data storage device for storing reporting message data received by data receiving device.

45. A data receiving device in accordance with claim 43, wherein the analog control signals transmitted by said transmitter include signals for logging into the switching node, and a request to the switching node to start spooling reporting message data stored in a buffer memory thereof.

46. A data receiving device according to claim 43, wherein said reporting messages comprise call identifying messages pertaining to a call placed through the switching node to or from a user terminal serviced by said switching node.

47. A data receiving device in accordance with claim 43, wherein the control signals transmitted by the transmitter comprise Dual-Tone MultiFrequency (DTMF) signals.

48. A data receiving device in accordance with claim 43, wherein the analog signals received by the receiver comprise Frequency Shift Keying (FSK) signals.

49. A data receiving device in accordance with claim 43, wherein said retransmit request signal is transmitted by said data receiving device immediately after each detection of a data packet error.

50. A data receiving device in accordance with claim 43, wherein said retransmit request signal is not transmitted until after all data packets of a respective reporting message are received by the data receiving device.

51. A data receiving device in accordance with claim 43, wherein said control signals include an instruction to substitute an alternative Directory Number to be used by said switching node in transmitting said reporting messages.

52. A data receiving device in accordance with claim 43, wherein said control signals include signals for causing said switching node to select a Directory Number from a list of stored Directory Numbers for use in transmitting said reporting messages.

53. A data receiving device in accordance with claim 43, wherein said control signals comprise a signal requesting said switching node to establish a call content communication path.

54. A data receiving device in accordance with claim 53, wherein said control signals further comprise a mute request signal for requesting that the switching node mute the call content communication path established by said switching node.

55. A machine readable storage medium containing a set of instructions which, when executed within a data receiving device of a telecommunications network, causes said data receiving device to carry out a voice grade line compatible method for selectively receiving data generated by a switching node of the telecommunications network, the method comprising:
receiving, at the data receiving device, analog signals comprising a plurality of data packets arranged according to a predetermined data packet framework and transmitted over an analog network link;
assembling said data packets to form reporting messages corresponding to data generated at said switching node; and
transmitting control signals originating from said data receiving device as analog control signals destined for said switching node, to thereby control an operational aspect of said switching node, wherein, in the method carried out upon execution of said instructions, upon detection of an error in a reporting message received from the switching node, said analog control signals include a retransmit request signal requesting said switching node to retransmit at least a portion of a said reporting message.

56. A machine readable storage medium according to claim 55, wherein the method carried out upon execution of said instructions further comprises recording reporting messages received at said data receiving device.

57. A machine readable storage medium in accordance with claim 55, wherein, in the method carried out upon execution of said instructions, the control signals transmitted by said data receiving device include signals for logging into the switch, and a request to the switching node to staff spooling reporting message data stored in a buffer memory.

58. A machine readable storage medium according to claim 55, wherein, in the method carried out upon execution of said instructions, said reporting messages comprise call identifying messages pertaining to a call placed through the switching node to or from a user terminal serviced by said switching node.

59. A machine readable storage medium in accordance with claim 55, wherein, in the method carried out upon execution of said instructions, the control signals transmitted by the data receiving device comprise Dual-Tone MultiFrequency (DTMF) signals.

60. A machine readable storage medium in accordance with claim 55, wherein, in the method carried out upon execution of said instructions, the analog signals received by the data receiving device comprise Frequency Shift Keying (FSK) signals.

61. A machine readable storage medium in accordance with claim 55, wherein, in the method carried out upon execution of said instructions, said retransmit request signal is sent immediately after each detection of a data packet error.

62. A machine readable storage medium in accordance with claim 55, wherein, in the method carried out upon execution of said instructions, said retransmit request signal is not sent until after all data packets of a respective reporting message are received by the receiving device.

63. A machine readable storage medium in accordance with claim 55, wherein, in the method carried out upon execution of said instructions, said control signals include an instruction to substitute an alternative Directory Number to be used by said switching node in transmitting said reporting messages.

64. A machine readable storage medium in accordance with claim 55, wherein, in the method carried out upon execution of said instructions, said control signals include signals for causing said switching node to select a Directory Number from a list of stored Directory Numbers for use in transmitting said reporting messages.

65. A machine readable storage medium in accordance with claim 55, wherein, in the method carried out upon execution of said instructions, said control signals comprise a signal requesting that said switching node establish a call content communication path.

66. A machine readable storage medium in accordance with claim 65, wherein, in the method carried out upon execution of said instructions, said control signals further comprise a mute request signal for requesting that the switching node mute the call content communication path established by said switching node.

67. A voice grade line compatible method for selectively transmitting data generated by a switching node of a telecommunications network to a data receiving device connected to the network, the method comprising:

generating data at said switching node;

transmitting to said data receiving device, over an analog network link, analog signals forming reporting messages corresponding to said data, each message comprising a plurality of data packets arranged according to a predetermined data packet framework;

receiving at said switching node control signals originating as analog signals sent from said data receiving device, said control signals pertaining to operation of said switching node; and operating said switching node in accordance with the control signals received from the data receiving device;

wherein prior to sending the reporting message, the switching node dials out to the data receiving device and prior to dialing out to the data receiving device, the switching node determines that a timer has expired.

68. A voice grade line compatible method for selectively receiving data generated by a switching node of a telecommunications network, the method comprising:

receiving, at a data receiving device connected to said network, analog signals comprising a plurality of data packets arranged according to a predetermined data packet framework and transmitted over an analog network link;

assembling said data packets to form reporting messages corresponding to data generated at said switching node; and transmitting control signals originating from said data receiving device as analog control signals destined for said switching node, to thereby control an operational aspect of said switching node;

wherein, said control signals comprise a signal requesting that said switching node establish a call content communication path and wherein said control signals further comprise a mute signal for requesting that the switching node mute the call content communication path established by said switching node.

* * * * *

UNITED STATES PATENT AND TRADEMARK OFFICE
CERTIFICATE OF CORRECTION

| | |
|---|---|
| PATENT NO. | : 7,388,947 B2 |
| APPLICATION NO. | : 10/387554 |
| DATED | : June 17, 2008 |
| INVENTOR(S) | : David B. Smith et al. |

It is certified that error appears in the above-identified patent and that said Letters Patent is hereby corrected as shown below:

Column 1, Line 4-7 after the title and before "FIELD OF THE INVENTION", insert the following paragraph:

--Acknowledgement of Government Support
 The U.S. Government has a paid-up license in this invention and the right in limited circumstances to require the patent owner to license others on reasonable terms as provided for by the terms of the CALEA Capability Enhancements Agreement awarded by the Federal Bureau of Investigation.--.

Signed and Sealed this

Fourteenth Day of April, 2009

JOHN DOLL
*Acting Director of the United States Patent and Trademark Office*